United States Patent [19]
Guyton

[11] 3,720,111
[45] March 13, 1973

[54] LEVER FOR BRAKE AND CLUTCH OPERATION ON CYCLE HANDLEBARS

[76] Inventor: Glen B. Guyton, 3401 E. Newton, Tulsa, Okla.

[22] Filed: June 4, 1971

[21] Appl. No.: 150,137

[52] U.S. Cl. ................................................... 74/489
[51] Int. Cl. ............................................. G05g 11/00
[58] Field of Search ....................... 74/488, 489, 501

[56] References Cited

UNITED STATES PATENTS

| | | | |
|---|---|---|---|
| 1,526,681 | 2/1925 | Round | 74/489 |
| 2,824,463 | 2/1958 | Gleasman et al. | 74/489 |

FOREIGN PATENTS OR APPLICATIONS

| | | | |
|---|---|---|---|
| 325,788 | 2/1930 | Great Britain | 74/489 |

*Primary Examiner*—William F. O'Dea
*Assistant Examiner*—Peter D. Ferguson
*Attorney*—William S. Dorman

[57] ABSTRACT

A lever for hand operation of the brakes and clutch from the handlebars of a cycle, wherein said lever is of a configuration for avoiding engagement with the fingers of the hand when the brakes or clutch members are actuated by depressing of the lever against the handlebars. The lever is particularly designed and constructed for ease of use during actuation of the brakes or clutch, but provides a sufficient clearance between the lever itself and the forefinger of the hand in the depressed position of the lever for precluding pinching or squeezing of the finger against the handlebars, thus improving the operating efficiency of the cycle.

7 Claims, 8 Drawing Figures

PATENTED MAR 13 1973   3,720,111
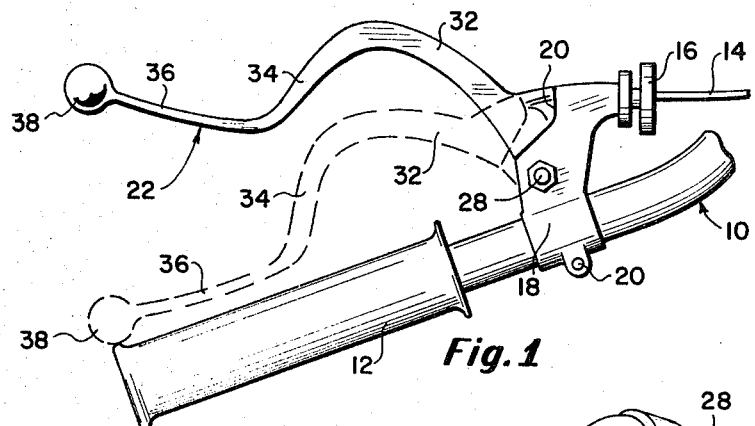
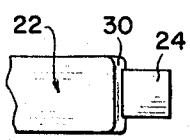
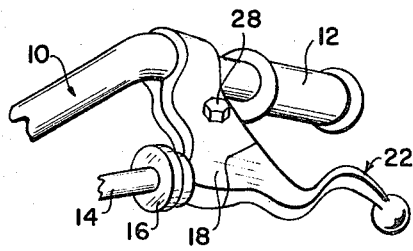
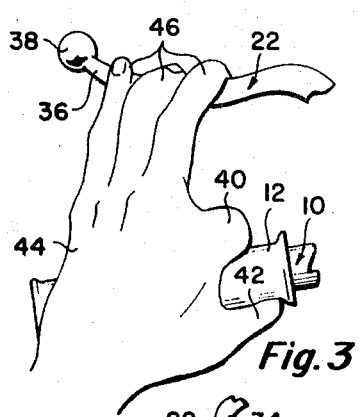
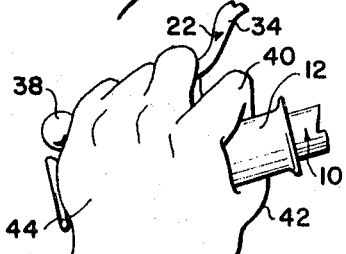
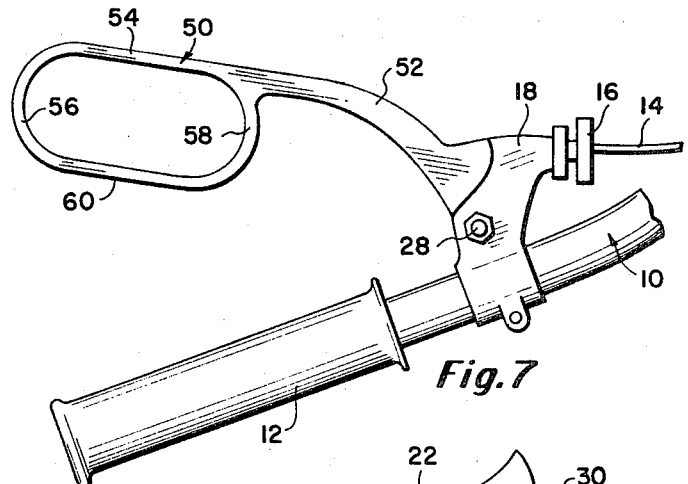
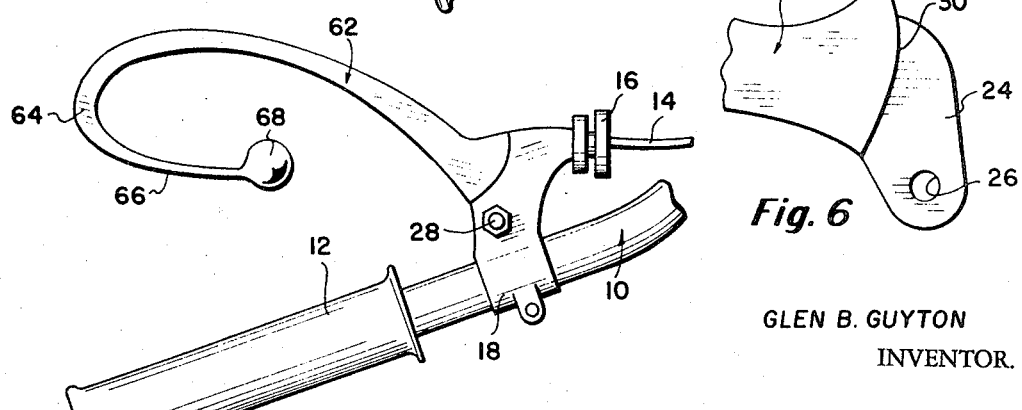
GLEN B. GUYTON
INVENTOR.
BY
William S. Dorman
ATTORNEY

LEVER FOR BRAKE AND CLUTCH OPERATION ON CYCLE HANDLEBARS

This invention relates to improvements in hand-operated Bowden control for vehicles provided with a handlebar and more particularly but not by way of limitation to a lever for hand control of the brakes and clutch mechanism of a cycle wherein the fingers of the hand are protected against engagement by the lever in the depressed position thereof.

Many vehicles having handlebars, such as motorcycles and the like, are provided with Bowden control means for actuation of the vehicle brakes, clutches, and the like. The usual brake or clutch lever which is connected with the Bowden cable is normally pivotally secured to the handlebars in substantially close proximity with the hand grip members and normally extends substantially straight from the pivotal connection toward the hand grip members and substantially parallel thereto. It is necessary that the lever be disposed somewhat closed to the hand grip members in the idle position thereof when the brake is not engaged, or the clutch is engaged in order that the lever is within reach of the fingers of the hand when the hand is gripping the handlebar at the hand grip members. In order for the driver of the cycle to engage the lever for actuation of the brake or clutch, with the usual present straight levers he must reach out with all of his fingers to engage the lever and depress the same against the hand grip member, or against the handlebars for actuation of the Bowden control. It will be apparent that the use of all his fingers around the lever for depressing thereof reduces the driver's control over the handlebars, and considering the fact that the times of actuation of the brake and/or clutch are frequently times of emergency, or at least times wherein control of the cycle is extremely vital or important, this is a great disadvantage in the usual levers which actuate the Bowden controls from the handlebars of the cycle.

The present invention contemplates a novel lever for actuation of the Bowden controls which is particularly designed and constructed for overcoming this disadvantage. The lever is of a configuration permitting positioning of a portion of the lever in close proximity with the hand grip members for ease of accessibility thereof, and positioning of another portion thereof away from the handlebars for precluding engagement with the forefingers gripping the handlebar grip members even when the lever is in the depresssed position during actuation of the Bowden control for engaging the brake or disengaging the clutch mechanism. The novel lever member may be manually grasped by three fingers while the forefinger may remain securely in place around the hand grip member or on the handlebars and when the lever is depressed against the handlebars by the pressure of the three fingers, the forefinger is not engaged by the depressed lever, and thus control of the vehicle is improved.

It is an important object of this invention to provide a lever for actuation of Bowden controls for vehicles having a handlebar wherein the lever may be efficiently depressed in a manner for efficient actuation of the Bowden controls while maintaining a more efficient control of the vehicle.

Another object of this invention is to provide a lever for actuation of Bowden controls for vehicles having a handlebar wherein the lever may be depressed by three fingers of the hand and the forefinger may remain securely in position around the handlebars without being engaged by the depressed lever.

A still further object of this invention is to provide a lever for actuation of Bowden controls for vehicles having a handlebar wherein the lever is simple and efficient in operation and economical and durable in construction.

Other and further objects and advantageous features of the present invention will hereinafter more fully appear in connection with a detailed description of the drawings in which:

FIG. 1 is a plan view of a lever embodying the invention and depicted secured to the usual Bowden control on a handlebar, with the free position of the lever shown in solid lines and the depressed position shown in broken lines.

FIG. 2 is a broken front perspective view of one end of a handlebar having a lever embodying the invention provided thereon.

FIG. 3 is a broken view of a handlebar hand grip portion and lever portion embodying the invention depicting a hand in position for depressing the lever.

FIG. 4 is a view similar to FIG. 3 depicting the hand and lever in the depressed position of the lever.

FIG. 5 is a broken top view of one end of a lever embodying the invention.

FIG. 6 is a side elevational view of the end of the lever shown in FIG. 5.

FIG. 7 is a plan view of a lever embodying a modified form of the invention and depicted secured to the usual Bowden control on a handlebar.

FIG. 8 is a view similar to FIG. 7 depicting a lever embodying another modification of the invention.

Referring to the drawings in detail, and particularly FIGS. 1 through 6, reference character 10 generally indicates the handlebars of a cycle, or other suitable vehicle (not shown) having the usual hand grip member 12 provided on the opposite ends thereof. Only one end of the handlebars 10 is shown in the drawings, and will be described in detail herein. However, it is to be understood that both ends of the handlebar 10 are substantially identical. With cycles or vehicles wherein the brakes and clutch are actuated by a Bowden control, the Bowden cable 14 may be secured to the handlebars in any suitable manner. As shown herein, the cable 14 extends through a flanged guide sleeve 16 which is threadedly or otherwise secured to a support member 18. The support member 18 may be of any well known type and is secured to the handlebars 10 in any suitable manner, such as clamped thereon by a bolt 20, or the like. The support 18 as shown herein is provided with an angled shoulder portion 20 on the outer portion thereof spaced from the guide sleeve 16, and is normally provided with a recess or slot (not shown) open in the direction of the hand grip member 12 for a purpose as will be hereinafter set forth.

A control lever, generally indicated at 22, is pivotally secured to the support member 18 in a manner as will be hereinafter set forth, and extends from the support 18 in a direction toward the hand grip member 12 as particularly shown in FIGS. 1 and 2. The lever 22 is provided with a reduced tongue member 24 at one end thereof adapted for insertion within the slot or recess (not shown) of the support member 18, and is preferably provided with an aperture 26 (FIG. 6) for alignment with complementary apertures (not shown) provided in the support 18 whereby the tongue 24 may be pivotally secured thereto by a pivot pin 28, or the like. An angled outwardly extending shoulder 30 is provided on the lever 22 conterminous with the reduced tongue 24, and is of a configuration complementary with the shoulder 20 for engagement therewith in the idle or released position of the lever 22. Suitable spring means (not shown) is connected between the tongue 24 and the inner portion of the support 18 for constantly urging the shoulder 30 into engagement with the shoulder 20, as is well known. In addition, the Bowden cable 14 is suitably connected with the tongue 24 for slidable movement within the sleeve 16 upon pivoting of the lever 22 as will be hereinafter set forth. The connection of the lever 22 with the support 18 and Bowden cable 14 is conventional, and is not limited to the particular arrangement depicted herein.

The longitudinal configuration of the lever arm 22 is substantially S-shaped, as particularly shown in FIGS. 1 and 2, and is provided with an outwardly or upwardly curved portion 32 as shown in the drawings extending from the support member 18 in a direction toward the outer extremity of the handlebars 10. The curved portion 32 bends substantially sharply and extends in a direction toward the hand grip member 12 as shown at 34. The portion 34 bends in a reverse direction and extends substantially straight therefrom as shown at 36, and preferably terminates in an enlarged knob member 38. In the normal position of the lever 22, the shoulder 30 is in engagement with the shoulder 20 as shown in solid lines in FIG. 1, and in the depressed position thereof, as will be hereinafter set forth, the shoulder 30 is moved away from the shoulder 20 and the lever is in the position shown in broken lines in FIG. 1.

Referring more particularly to FIGS. 3 and 4, when it becomes desirable or necessary to engage the brakes (not shown) or disengage the clutch (not shown) of the vehicle through actuation of the Bowden cable 14, as is well known, the driver of the vehicle may leave the forefinger 40 and thumb 42 of his hand 44 encircled about the hand grip member 12 while reaching out with the remaining fingers 46 to engage or grasp the portion 36 of the lever 22, as clearly shown in FIG. 3. The fingers 46 may then be utilized for depressing or pulling the lever 22 in a direction toward the hand grip 12 as shown in FIG. 4. The portions 32 and 34 of the lever 22 provide clearance for the forefinger 40, thus permitting retaining of the forefinger 40 around the grip member 12 in order to maintain a more efficient control of the vehicle during actuation of the lever 22. Of course, when the fingers 46 are disengaged from the portion 36, the spring means (not shown) will return the lever 22 to the normal position thereof as shown in solid lines.

Referring now to FIG. 7, reference character 50 generally indicates a modified lever for operation of the Bowden cable 14 in a generally similar manner as the lever 22. The lever 50 may be pivotally secured to the support 18 and Bowden cable 14 in the same manner as hereinbefore set forth for actuation of the brakes and/or clutch. However, the configuration of the lever 50 is somewhat different from the configuration of the lever 22. The lever 50 comprises a slightly upwardly curving portion 52 extending from the support 18 in a direction toward the outer end of the handlebars 10. The curved portion 52 extends into a substantially straight outer portion 54 which is the upper limb of a closed loop having arcuate oppositely disposed end portions 56 and 58 and a lower limb 60, as viewed in the drawings. In the normal position of the lever 50, the loop member is in an upper or outward position spaced from the hand grip member 12. When it is necessary or desirable to actuate the Bowden cable 14 for any reason, the forefinger 40 and thumb 42 may remain in secure engagement around the grip member 12, and the remaining fingers 46 may be extended for grasping the lower limb 60 of the closed loop to depress or pull the lever 50 in a direction toward the grip 12. The limb 60 of the loop member may be moved into close proximity of the grip 12 or into engagement therewith. The loop is sufficiently long for receiving the fingers 46 but sufficiently short for avoiding contact with the forefinger and the upwardly or outwardly arching portion 52 will not engage the forefinger surrounding the grip 12. Thus, the Bowden cable 14 may be actuated while maintaining a firm and efficient grip on the handlebars 10.

Referring now to FIG. 8, reference character 62 generally indicates still another modification of a lever for operation of the Bowden cable 14 in a generally similar manner as the lever 22. The lever 62 may be pivotally secured to the support 18 and Bowden cable 14 in the same manner as hereinbefore set forth for actuation of the brakes and/or clutch. The lever is of an upwardly or outwardly curving or arcuate configuration extending from the support 18 in a direction toward the outer extremity of the handlebars 10. The lever 62 curves upwardly and outwardly away from the handlebars 10 and terminates in an open loop member comprising an arcuate closed end 64 and a lower or inner limb 66 terminating in an enlarged knob member 68. When the Bowden cable 14 is to be actuated, the forefinger 40 and the thumb 42 may remain encircled about the grip member 12, and the fingers 46 may reach out for the limb 66 of the open loop whereupon the lever 62 may be depressed or pulled in a direction toward the grip 12. The open loop is of a length sufficiently long for receiving the fingers 46 therein, but sufficiently short for avoiding contact with the forefinger, and the upwardly curving configuration of the lever 62 avoids any engagement with the forefinger, thus facilitating operation of the Bowden cable while maintaining a more efficient control of the vehicle.

From the foregoing it will be apparent that the present invention provides a novel lever for actuation of a Bowden cable for hand operation of the brakes and clutch from the handlebars of a cycle. The lever is of a particular configuration wherein the forefinger and thumb of the hand may remain in position around the handlebar grip member, and the remaining fingers may be utilized for pivoting or depressing of the lever without engagement of the forefinger, thus increasing the efficiency of the operation of the Bowden cable while maintaining a more efficient control of the vehicle. The novel lever is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is Claimed is:

1. In combination with a Bowden control secured to the handlebars of a vehicle for hand operation of the vehicle brakes and clutch through manipulation thereof by the fingers of the hand, a pivotal lever secured to the handlebars and operably connected with the Bowden control for actuation thereof and comprising an arm having a finger receiving portion engagable by certain fingers for pivoting of the lever in one direction while a forefinger remains encircled about the handlebars in the proximity of the Bowden control, an arcuate portion conterminous with the finger receiving portion and spaced away from the handle bars in all positions of the lever to provide clearance for the forefinger encircling the handlebars in the proximity of the Bowden control whereby the brakes and clutch may be operated by the fingers without loss of hand control of the handlebars.

2. In combination with a Bowden control secured to the handlebars of a vehicle for hand operation of the vehicle brakes and clutch, a pivotal lever as set forth in claim 1 wherein the arm is of a substantially S-shaped configuration to provide said finger receiving portion in said arcuate portion.

3. In combination with a Bowden control secured to the handlebars of a vehicle for hand operation of the vehicle brakes and clutch, a pivotal lever as set forth in claim 1 wherein the arcuate portion curves outwardly and away from the handlebars, and the finger receiving portion is substantially straight for facilitating engagement thereof by a plurality of the fingers.

4. In combination with a Bowden control secured to the handlebars of a vehicle for hand operation of the vehicle brakes and clutch, a pivotal lever as set forth in claim 3 wherein the finger receiving portion includes a closed loop member for engagement by the said plurality of fingers.

5. In combination with a Bowden control secured to the handlebars of a vehicle for hand operation of the vehicle brakes and clutch, a pivotal lever as set forth in claim 4 wherein the closed loop is sufficiently long for receiving the fingers therein and sufficiently short for avoiding engagement with the forefinger encircling the handlebars.

6. In combination with a Bowden control secured to the handlebars of a vehicle for hand operation of the vehicle brakes and clutch, a pivotal lever as set forth in claim 3 wherein the finger receiving portion includes an open loop member for engagement by the said plurality of fingers.

7. In combination with a Bowden control secured to the handlebars of a vehicle for hand operation of the vehicle brakes and clutch, a pivotal lever as set forth in claim 6 wherein the open loop member is sufficiently long for receiving the fingers therein and sufficiently short for avoiding engagement with the forefinger.

* * * * *